March 29, 1949.   S. L. CROWELL   2,465,674
AUTOMATIC BLADE DROOP STOP
Filed Aug. 7, 1945

SERGE LEONID CROWELL
INVENTOR

BY *Gifford S. Holmes*
AGENT

Patented Mar. 29, 1949

2,465,674

UNITED STATES PATENT OFFICE 2,465,674

AUTOMATIC BLADE DROOP STOP

Serge L. Crowell, New York, N. Y., assignor to United Aircraft Corporation, East Hartford, Conn., a corporation of Delaware Application August 7, 1945, Serial No. 609,389

10 Claims. (Cl. 170—160.24)

The present invention relates to rotary wing type aircraft and more particularly to means for controlling the motion of the rotor blades thereof.

An object of this invention is to provide automatic mechanism for limiting the downward movement of the rotor blades when at rest and permit movement in excess of such limit when in flight.

Another object is to provide structure as set out above with means coordinated with the manual control means of the craft for disabling the automatic mechanism.

Other objects reside in the features of construction and arrangement of parts of my improved device, and will be either obvious or pointed out in the following specification and claims.

When a helicopter is in flight, the rotor blades mounted on flapping hinges assume a coning angle determined by the lift of the blades opposed by the centrifugal force thereof. In the helicopter to be described hereinafter, the tip path plane of the rotor blades may be tilted by cyclically feathering the rotor blades to cause the thrust of the rotor to exert a directional component for propelling the helicopter. When the tip path plane is tilted, it is desired to have a rotor blade moving into a position in the direction of motion assume a relatively lower position than it will assume when it is diametrically opposite to such position. At such time, it is often desirable that the tip path plane move more rapidly than the tilting of the body of the helicopter and to have the rotor blade more closely approach the body than normally permitted. At other times, when the rotor is turning slowly, it is desirable to prevent the rotor blades from falling below a given position to prevent them from touching other portions of the craft and injuring the same or the blades during such slower rotation periods, since the normal flexibility of the blades will permit more droop in the blades than when they are rotating at higher speeds.

Figure 1:
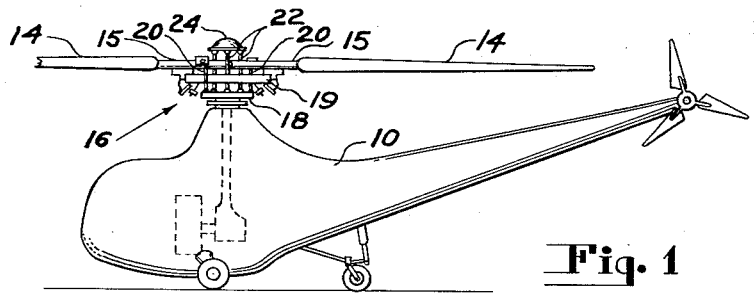
Fig. 1 is a side elevation view of a helicopter provided with a presently preferred form of my control mechanism, with the parts shown in a position they will take when the craft is on a supporting surface and the rotor blades at rest, or rotating slowly.
Figure 2:
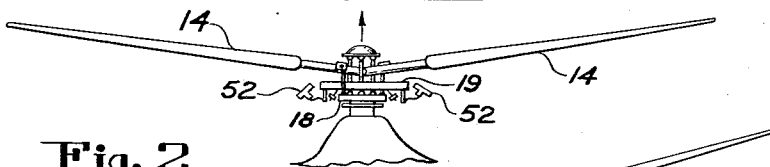
Fig. 2 is a partial view similar to Fig. 1 but showing the rotor blades in the position they take when the helicopter is in vertical ascent.
Figure 3:
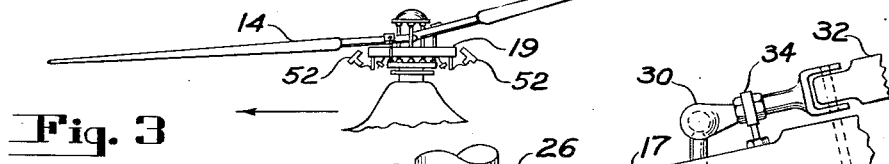
Fig. 3 is a view similar to Fig. 2 but showing the position of parts of the rotor head when the helicopter is in flight in the direction of the arrow.

When the helicopter is standing upon a surface such as the ground or landing deck of a boat or the like, it is desired to have the rotor blades remain in position substantially as shown in Fig. 1. When the rotor blades are turned at a high enough speed so that they will cone upwardly, the attitude of the blades may be substantially as shown in Fig. 2. At some conditions of translational flight, it may be desired that the rotor blades assume a position such as shown in Fig. 3. It is to be noted that the position of the left hand blade of Fig. 3 is substantially lower than in either Fig. 1 or Fig. 2. The automatic blade stop mechanism of this invention fulfills all of these requirements.

Figure 4:
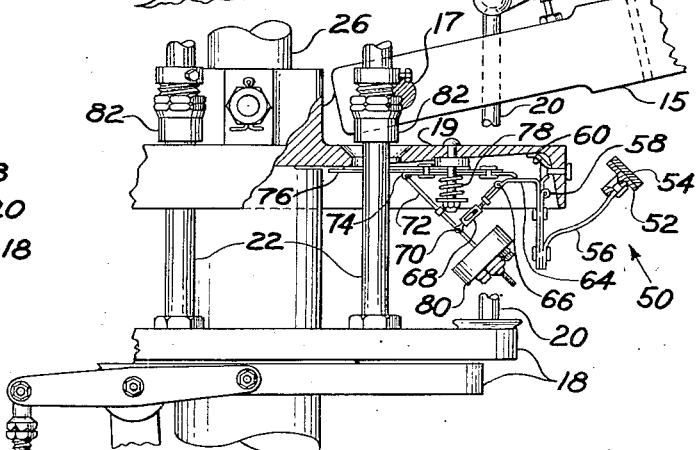
Fig. 4 is a view partly diagrammatic and partly in detail showing operating parts of a movable stop mechanism in an inactive position under the influence of centrifugal force.

In Fig. 1, a helicopter 10 is provided with a sustaining rotor comprising blades 14 mounted on flapping hinges 15 carried by pins 17 upon lugs, not shown, upon a plate 19 (Fig. 4).

A pitch control mechanism 16 comprises a bodily movable and tiltable pair of plates 18 secured by ball bearings to each other, and the lower plate held non-rotatably with respect to the body and the upper plate turnable with the rotor 12. All of the details of construction are not shown herein but they may be of the type shown and described in the co-pending application of Ralph Paul Alex and Michel D. Buivid, U. S. application Ser. No. 599,920, filed June 16, 1945, or other suitable structure. Compression tension rods 20 are connected with the rotor blades 14 and the upper plate 18 so that positional movements of the plate 18 will cause a pitch change of the blades 14. Rods 22 also connect with the upper plate 18 and with a guide head 24 that may slide up and down upon a shaft extension 26 (Fig. 4).

Figure 5:
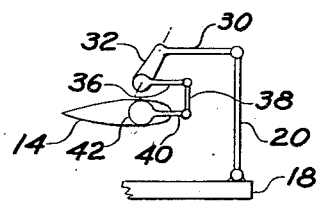
Fig. 5 is a diagrammatic view of parts of the rotor blade pitch control mechanism.

When the upper plate 18 is moved upwardly, the rods 20 and 22 are moved upwardly, and the rod 20 will rotate an arm 30 (Fig. 5) connected with a shaft 32 secured by bearings 34 to the flapping hinge 15 to rotate an arm 36 connected by a link 38 to an arm 40 secured to a spar 42 of the blade 14. Thus, upward movements of the plate 18 will cause the pitch of the blades 14 to increase and downward movement of the plate 18 will reduce the pitch of the blades 14 and decrease and lift capacity thereof.

Mechanism for providing an automatic stop for the downward travel of one of the rotor blades upon slow rotation or reduced pitch is generally indicated at 50, it being understood that a similar mechanism 50 is provided for each of the other blades 14. Each mechanism 50 includes a stop head 52 provided with a resilient pad 54 and carried upon a rigid arm 56, which arm is carried in turn by a pivot 58 upon a bracket 60 secured by a rivet or the like to the plate 19 which mounts the flapping hinge 15. An extension arm 64 is pivoted at 66 to a link 68 pivoted at 70 to a weight-carrying arm 72 pivoted on a pin 74 to a plate 76 which is biased upwardly by a spring 78 to the position shown in Fig. 4.

When the rotor 12 is turning at a predetermined speed, a weight 80 adjustably secured on arm 72 will swing out to the position shown in Fig. 4 and move the link 68 upwardly to rock the stop head 52 around the pivot 58 and move it to the inactive position shown in Fig. 4. As the speed of rotation of the rotor decreases, the weight will move clockwise around its pivot 74 and move the stop head 52 counterclockwise around its pivot 58 until the stop lies between the plate 19 and the flapping hinge 15 to thereby limit the downward travel of the blade 14 when the rotor is turning slowly.

Figure 6:
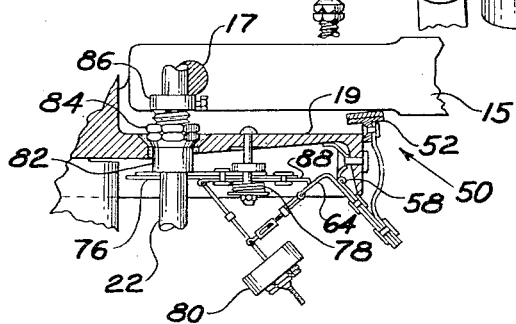
Fig. 6 is a view similar to Fig. 4 but showing the rotor blade stop in its active position when the rotor is in the position shown in Fig. 1.

Additional means for placing the stop 52 into its blade stopping position between the flapping hinge 15 and the blade 62 comprises a shoulder 82 secured by adjustment nuts 84 upon a rod 22 and by a lock sleeve 86. Each rod 22 has a similar shoulder 82. As best shown in Fig. 6, when the rod 22 is lowered because of lowering of the plates 18, the shoulder 82 will engage the plate 76 and move it downwardly against the tension of the spring 78 and the centrifugal force of the weight 80. This will cause an inner end 88 of the plate 76 to engage the arm 64 of the stop mechanism 50 and rotate the stop mechanism around the pivot 58 to move the stop head 52 into the active position shown in Fig. 6 and thus limit downward movement of the flapping hinge 15 and hence the blade 14 under low pitch conditions for the rotor blade 14.

From the foregoing, it is seen that I have provided an improved limit stop for rotor blades of rotary wing aircraft which acts automatically upon reduction in rotor speed to place the stop in active position and also is operable manually for moving a stop to active position when the pitch of the rotor blades is reduced to such a degree that damage to an operating part might result upon sudden changes of attitude of a helicopter. It is to be noted that the operating rods 22 for performing this manual function are spaced inwardly from the position of the blade pitch control rods 20 so that the effects of cyclic tilting of tiltable plates 18 does not appreciably affect the operation of the stop means until a maximum permissible limit has been reached in the condition of low pitch and maximum cyclic pitch. Obviously, many other arrangements for the device to obtain modified functions will occur to those skilled in the art. For these reasons, I wish not to be limited in my invention only to that form shown and described but by the spirit and scope of the following claims.

I claim:

1. In rotary wing aircraft, rotor mechanism comprising, in combination, a rotatable support, a rotor blade hinged on said support for flapping and pitch changing movement, a stop movably mounted with respect to said support for limiting the downward movement of said blade, means for moving said stop automatically when said support is rotated, and means modifying the operation of said last means including means for changing the pitch of said blade.

2. In rotary wing aircraft, rotor mechanism comprising, in combination, a rotatable support, a rotor blade hinged on said support for flapping movement, control means for controlling said blade, a stop mounted for movement with respect to said support and movable between a position in which it can limit downward flapping movement of said blade with respect to said support and another position wherein it cannot perform such function, means responsive to rotation of said support for moving said stop between said positions, and means including said control means for modifying the action of said stop.

3. In rotary wing aircraft, rotor mechanism comprising, in combination, a rotatable support, a blade mounted on said support for flapping movement and pitch changing movement, a stop movable between operative and inoperative positions for limiting flapping movement of said blade when said stop is in its operative position, automatic means operable upon rotation of said support for exerting a force tending to move said stop to its inoperative position and means for disabling said automatic means, including manual means for changing the pitch of said blade.

4. In rotary wing aircraft, rotor mechanism comprising, in combination, a rotatable support, a blade mounted on said support for flapping movement and pitch changing movement, a stop movable between operative and inoperative positions for limiting the flapping movement of said blade when said stop is in its operative position, automatic means operable upon rotation of said support for exerting a force tending to move said stop to its inoperative position, means for disabling said automatic means including manual means for reducing the pitch of said blade, movable mounting means for said automatic means, and means for selectively connecting and disconnecting said manual means and said mounting means when said blade is rotated toward and away from a predetermined angle of incidence.

5. In rotary wing aircraft, rotor mechanism comprising, in combination, a rotatable support, a rotor blade hinged on said support for flapping and pitch changing movement, and stop means for limiting the flapping movement of said blade comprising, in combination, a base member yieldably secured to said support, a weight pivotally mounted on said member for swinging outwardly from the center of rotation of said support when rotated, a stop pivotally mounted on said support, and connecting means between said weight and said stop whereby said weight moves said stop when the support is rotated.

6. In rotary wing aircraft, a rotor mechanism comprising, in combination, a rotatable support, a rotor blade hinged on said support for flapping and pitch changing movement, and stop means for limiting the flapping movement of said blade as a function of pitch of said blade comprising, in combination, a base member yieldably secured to said support, a weight pivotally mounted on said member for swinging outwardly from the center of rotation of said support when rotated, a stop pivotally mounted on said support, connecting means between said weight and said stop whereby said weight moves said stop when the support is rotated, and manual means for changing the pitch of said blade and for disabling said weight when the pitch is at a predetermined angle.

7. In rotary wing aircraft, rotor mechanism comprising, in combination, a rotatable support, a rotor blade hinged on said support for flapping and pitch changing movement, and stop means for limiting the flapping movement of said blade as a function of pitch of said blade comprising, in combination, a base member yieldably secured to said support, a weight pivotally mounted on said member for swinging outwardly from the center of rotation of said support when rotated, a stop pivotally mounted on said support, and connecting means between said weight and said stop whereby said weight moves said stop when the support is rotated, and manual means for changing the pitch of said blade and locking said stop in an active position.

8. In rotary wing aircraft, rotor mechanism comprising, in combination, a rotatable support, a rotor blade hinged on said support for flapping and pitch changing movement, and stop means for limiting the flapping movement of said blade as a function of pitch of said blade comprising, in combination, a base member yieldably secured to said support, a weight pivotally mounted on said member for swinging outwardly from the center of rotation of said support when rotated, a stop pivotally mounted on said support, connecting means between said weight and said stop whereby said weight moves said stop when the support is rotated, and manual means for changing the pitch of said blade and locking said stop in an active position when the pitch is at a predetermined minimum angle of incidence.

9. In rotary wing aircraft, means for preventing a rotor blade from moving below a predetermined position at rest while permitting movement past said position in flight comprising, in combination, a rotatable support, a rotor blade mounted on said support, a stop carried by said support movable between active and inactive positions with respect to said blade, means responsive to centrifugal force operatively connected to said stop for moving the same to the inactive position when said blade is rotated, manual means for changing the pitch of said blade, and means for locking said stop in said active position whenever said blade is at and below a predetermined angle of incidence, including a blade stop actuating member responsive to operation of said manual means.

10. In rotary wing aircraft, rotor mechanism comprising, in combination, a rotatable support, a blade mounted on said support for flapping and pitch changing movement a stop movable to effective and ineffective positions for limiting flapping movement of said blade when said stop is in its effective position, automatic means operable upon rotation of said support for exerting a force tending to move said stop to its ineffective position, mounting means for said automatic means, said mounting means being movable between a first position in which said automatic means is locked against operation and a second position in which said automatic means is free to operate, manual means for varying the pitch of said blade, and means for moving said mounting means from said second position to said first position and from said first position to said second position when said manual means cause the pitch of said blade to be decreased toward and increased from a predetermined blade pitch.

SERGE L. CROWELL.

REFERENCES CITED

The following references are of record in the file of this patent:

UNITED STATES PATENTS

| Number | Name | Date |
|---|---|---|
| 2,151,215 | Larsen | Mar. 21, 1939 |
| 2,396,038 | Bossi | Mar. 5, 1946 |